April 21, 1936. J. W. WRIGHT ET AL 2,037,844
SOLENOID VALVE
Filed March 1, 1935
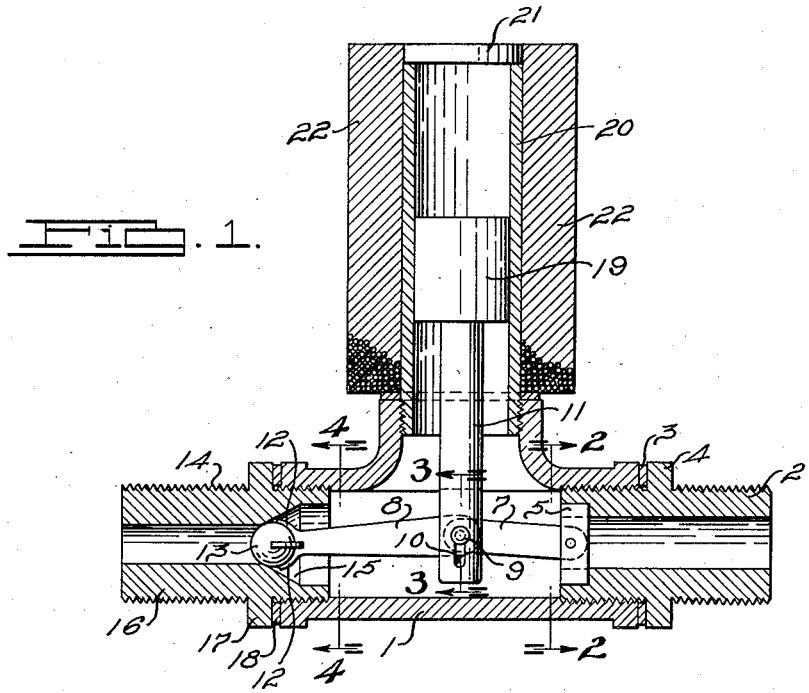
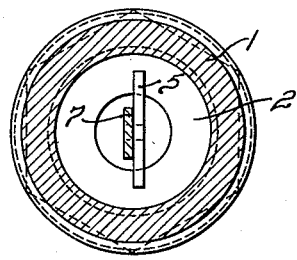
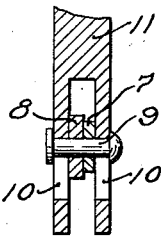
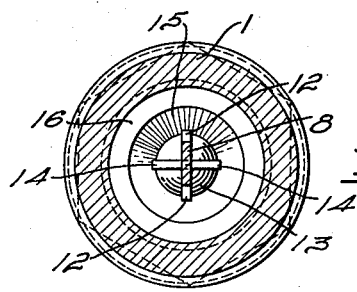
INVENTORS.
Judson W. Wright,
Edgar H. Glinz.
BY
ATTORNEY Patented Apr. 21, 1936

2,037,844

UNITED STATES PATENT OFFICE 2,037,844

SOLENOID VALVE

Judson W. Wright and Edgar H. Glinz, Detroit, Mich.

Application March 1, 1935, Serial No. 8,799

3 Claims. (Cl. 137—139)

This invention relates to solenoid valves and the object of the invention is to provide a valve for use with comparatively low pressures and arranged to be opened by means of a solenoid.

Another object of the invention is to provide a solenoid valve in which the valve is automatically closed by gravity as soon as the solenoid is de-energized.

A further object of the invention is to provide a solenoid valve comprising a pair of pivoted arms, one arm being pivoted on a stationary pivot and the other arm being pivoted to the first arm and carrying the valve member, an operating member being connected to the pivot between the two arms to move the valve member away from its seat or toward its seat by movement of the operating member.

Another object of the invention is to provide a solenoid valve including an operating member which may start on its upward stroke before disengaging the valve from its seat in order to overcome the inertia of the valve parts.

These objects and the several novel features of the invention are hereinafter more fully described and claimed and the preferred form of construction by which these objects are attained is shown in the accompanying drawing in which—

Fig. 1 is a section through a solenoid valve embodying my invention.

Fig. 2 is an enlarged section taken on line 2—2 of Fig. 1.

Fig. 3 is an enlarged section taken on line 3—3 of Fig. 1.

Fig. 4 is an enlarged section taken on line 4—4 of Fig. 1.

The device comprises a housing 1 which is similar to a T-union. A member 2 is threaded into one end of the T-union and a gasket 3 is engaged between the end of the T-union and the flange 4 of the member 2. The inner end of the member 2 is provided with slots into which a metal support 5 is pressed. This metal support 5 consists of a strip of metal which is pressed into the slots 6 in the member 2 and extends diametrically across the opening through the center of the member 2. An arm 7 is pivotally mounted on the member 5, as shown in Figs. 1 and 2, and a valve arm 8 is pivotally connected to the end of the arm 7 by the pin 9 shown more particularly in Fig. 3. The ends of this pin 9 extend through slots 10 provided in the lower end of the operating member 11, as shown more particularly in Fig. 2. The opposite end of the valve arm 8 is provided with a pair of fingers 12 engaging over the ball 13 and a cross member 14 shown in Fig. 4 is fitted into the end of the arm 8 and also engages over the ball 13. This ball is freely mounted in the fingers 12 and member 14 and fits on a conical valve seat 15 provided in the member 16. This member 16 is provided with a flange 17 and is threaded into the opposite end of the T-union 1 until the flange 17 presses the gasket 18 against the end of the T-union. The valve operating member 11 is provided with an enlarged cylindrical upper end 19 which rides in the pipe or tube 20 which in turn is threaded into the T-union as shown.

The upper end of this pipe is closed with a plug 21 and a solenoid coil 22 is mounted about the pipe. In the position shown in full lines in Fig. 1, the upper ends of the slots 10 in the member 11 rest on the pin 9 so that the full weight of the member 11 and head 19 rests on this pivot point. It will be noted that this pivot point remains slightly above dead center to insure the full weight of the member 11 holding the ball 13 against its seat. Should the solenoid coil 22 be energized at this time, the member 11 and head 19 which are made of iron will be quickly moved upwardly. Due to the length of the slots 10, this upward movement is well under way before the lower end of said slots 10 pick up the pin 9 and as this pin is picked up the arms 7 and 8 are turned on the pivot pin 9 and the upper finger 12 of the arm 8 will move over the ball 13 and push it off from its seat so that at the upper end of its stroke, the ball will rest near the end of the member 16 where the conical valve seat is enlarged. If the coil 22 is de-energized at this time, the member 11 with its weighted end 19 will fall by gravity and as the upper end of the slots 10 engage the pin 9, the arms 7 and 8 are turned back to the position shown in full lines in Fig. 1 thus pushing the ball 13 against its seat and closing the valve. By means of unions an inlet pipe may be connected to the member 16 and an outlet pipe may be connected to the member 2 so that flow through the pipe line may be controlled by the valve. It is also possible to use the member 2 for the inlet connection and the member 16 for the outlet connection in which case the pressure of the fluid would then assist in holding the ball 13 against its seat.

From the foregoing description it becomes evident that the device is very simple and efficient in operation, will not easily get out of order, is positive in action and provides a device which accomplishes the objects described.

Having thus fully described our invention, its utility and mode of operation, what we claim and desire to secure by Letters Patent of the United States is—

1. In a solenoid valve, a housing, a tubular member threaded into one end of the housing and provided with a valve seat, a tubular member threaded into the opposite end of the housing and provided with a pivot support, an arm pivotally mounted on said support, a second arm, a pivot pin pivotally connecting the two arms, a ball supported in the end of the second arm and arranged to engage the valve seat, a valve operating member movable vertically in the housing and provided with a slot, the pivot pin connecting the arms riding in the said slot and a solenoid coil about the upper end of the valve operating member, the arrangement being such that as the solenoid coil is energized the valve operating member is raised to turn the arms on the pivot pin and disengage the ball from its seat and as the solenoid is de-energized the valve operating member falls by gravity to turn the arms back to the original position and return the ball to its seat.

2. In a solenoid valve, a housing having an inlet and an outlet, a valve operating member, a solenoid for moving the valve operating member vertically upward only, the valve operating member being weighted and movable by gravity in the opposite direction and being provided with a slotted lower end, a pivot pin riding in said slotted end, a pair of arms pivotally mounted on the pivot pin, one of said arms being pivotally mounted in the housing, a ball carried by the other arm, the inlet being provided with a seat for the ball and the upper end of the slot in the valve operating member normally resting on the pivot pin by gravity, the weight being sufficient to maintain the arms in position to hold the ball on its seat, the arrangement being such that when the solenoid is energized the valve operating member is moved upwardly and as the lower end of the slot engages the pin the pin is lifted to turn the arms on the pivot and withdraw the ball from its seat.

3. In a solenoid valve, a housing having an inlet and an outlet, a valve operating member comprising a rod having an enlargement, a tube extending vertically over the housing in which the rod and enlargement are movable, an electric coil about the tube providing a solenoid in conjunction with the rod and enlargement, a lever pivoted at a fixed point in the housing and a second lever having an end pivoted to the free end of the first lever, a slot in the rod, and a pin connecting the said two ends of the levers riding in the slot, a ball at the opposite end of the second lever, the inlet being provided with a seat for the ball, the two levers providing a toggle and the rod and enlargement providing sufficient weight to hold the ball in its seat, the arrangement providing that upon current flow through the coil the rod and enlarged portion thereof will be raised until the pin engages the bottom of the slot whereupon by further movement the ball is released from its seat.

JUDSON W. WRIGHT.
EDGAR H. GLINZ.